United States Patent [19]
Rassieur

[11] 3,895,726
[45] July 22, 1975

[54] MOVABLE AUGER RACK

[75] Inventor: Charles L. Rassieur, University City, Mo.

[73] Assignee: Central Mine Equipment Company, St. Louis, Mo.

[22] Filed: Mar. 20, 1973

[21] Appl. No.: 342,955

[52] U.S. Cl.............. 214/83.24; 296/26; 211/60 R; 211/94.5
[51] Int. Cl............................................. B60p 3/00
[58] Field of Search ................................ 214/83.24; 296/3–9, 26, 37, 37.2; 211/60 R, 94.5, 162; 224/42.35, 42.06, 42.05, 42.44

[56] References Cited
UNITED STATES PATENTS

| | | | |
|---|---|---|---|
| 3,157,424 | 11/1964 | Hall................................ | 211/60 R X |
| 3,294,267 | 12/1966 | Schweigert.................... | 214/83.24 X |
| 3,554,415 | 1/1971 | Woods............................ | 224/42.05 |
| 3,599,810 | 8/1971 | Wanko.......................... | 214/83.24 X |
| 3,708,074 | 1/1973 | Fahey et al. .................... | 211/162 X |

Primary Examiner—Albert J. Makay
Attorney, Agent, or Firm—Polster and Polster

[57] ABSTRACT

A truck body adapted for drilling has a movable auger rack mounted beneath the bed of the truck. A worker can lift an end of an auger vertically without reaching, since the augers in the rack may be moved outboard of the truck bed. The rack is operatively connected to drive means, preferably of a hydraulic variety. The rack is a skeleton structure adapted for carrying drilling augers and especially hollow stem augers. A pair of parallel tracks traverse the major axis of the truck bed on the undercarriage side of the bed. A dolly structure is mounted on rollers. The rollers ride in and are held by the track. The rack is attached to the dolly structure. The dolly structure carries the entire weight of the rack, cantilever fashion, in all positions defined by rack movement. Those positions include at least a first position where the rack is concealed beneath the truck bed and a second position where the rack is extended outwardly of the truck bed.

6 Claims, 4 Drawing Figures

PATENTED JUL 22 1975

SHEET 1

3,895,726

MOVABLE AUGER RACK

BACKGROUND OF THE INVENTION

This invention relates to vehicle mounted earth drills and in particular to a vehicle provided with a concealed, extendable auger rack mounted beneath the bed of the vehicle. While the invention is described in particular detail with respect to drilling units, those skilled in the art will recognize the wide applicability of this invention to other vehicular uses.

In operation, the vehicle mounted drilling units are moved to a desired drilling site. During such extended transit period, the drilling apparatus, of practical necessity, is disassembled in order to make travel a practical reality. One method and apparatus for disassembling a drilling apparatus is disclosed in the U.S. Pat. to Rassieur, No. 3,527,309, issued Sept. 8, 1970. It is common to use augers in conjunction with the type of drilling apparatus and vehicle therein described. The augers are interconnected sequentially during the drilling operation, as hole depth increases.

It heretofore has been conventional to carry the vehicle auger complement beneath the vehicle, for example, in an non-movable enclosed section similar to that shown in FIG. 1 of the Rassieur patent discussed above, and on the truck bed itself. In order to accomplish the drilling operation, the individual auger section must be removed by hand, carried toward the rear of the vehicle where the drilling operation is in progress, and interconnected with the auger section previously placed in the ground. While a drill equipped with a hoist can assist in this operation, the auger section still must be manuevered by hand from beneath the truck bed. Where the auger sections are carried on the truck flatbed itself, the auger has to be lifted over the top of the framed holder, where the holder is similar to that illustrated in FIG. 1 of the U.S. Pat. No. 3,527,309 patent previously mentioned, or otherwise removed from a similar enclosure containing the auger sections. This is inconvenient to accomplish even with hoist assist because a workman, normally standing on the ground, has to reach above the truck bed to lift one end of the auger. Augers carried beneath the truck bed are lower to the ground and thus do not have to be lifted as high when loading or unloading. The underbed auger arrangement disclosed hereinafter materially reduces the physical effort and its attendant fatigue, required to conduct most drilling operations.

A majority of drilling work can be completed with less than the full complement of auger sections normally carried by the mobile drilling unit. Although augers, in some instances, are carried on the truck bed, those augers carried by the rack of this invention are used first. The rack of this invention, in turn, materially reduces the time and effort required to interconnect subsequent auger sections. A hollow drilling auger weighs between 50 and 80 pounds. Their weight and geometry make them difficult to carry. By utilizing a movable auger rack, beneath the truck bed, a drill equipped with a hoist can be used to lift individual auger sections. By attaching the hoist to the one end of the auger, the hoist can be utilized to lift half of the auger while a worker lifts the other half. As the worker lifts his half of the auger and walks around the truck bed to the drilling operation, the auger necessarily moves from a horizontal to a vertical position and the hoist is carrying almost the entire load. From that position, the subsequent auger section easily is interconnected to the prior section, already in the ground. Upon completion of drilling the reverse procedure is used. It is impossible to perform the above described operation with an under body auger rack that does not slide away from the truck body. Even manual handling of augers becomes easier with the invention disclosed herein, because the rack slides out into a position where individual auger sections are easier to manipulate.

A number of other considerations add to the convenience of the movable auger rack. For example, augers commonly become dirty during drilling operations, as mud and other debris cling to the auger structure. Cleaning commonly is accomplished by a conventional hose down operation. When the augers are carried on the flatbed, dirt from the augers tend to foul other equipment on the vehicle. Because of the simplicity of interconnecting auger sections carried by the slidable rack disclosed hereinafter, those auger sections carried beneath the truck bed often are used initially for drilling. As indicated above, a majority of drilling operations can be completed with the number of augers less than the total auger complement. Because the rack of this invention extends outwardly of the truck bed, if these augers are cleaned at all, they can be cleaned without disrupting or fouling other equipments of the mobile drilling unit. In addition, maintenance time and costs involved in conducting the cleaning operation are reduced appreciably.

One of the objects of this invention is to provide a vehicle having improved means for carrying drilling augers.

Another object of this invention is to provide a structure which permits easy handling and cleaning of drilling augers.

Another object of this invention is to provide a structure for carrying drilling augers that is movable between at least first and second positions.

Another object of this invention is to provide a hydraulically operated compartment for drilling augers and the like.

Other objects of this invention will be apparent to those skilled in the art in light of the following description and accompanying drawings.

SUMMARY OF THE INVENTION

In accordance with this invention, generally stated, a vehicle is provided with a movably mounted rack concealed beneath the bed of the vehicle. The rack is operated hydraulically. In its normal position, the rack is concealed beneath the vehicle bed while the rack is exposed outwardly of the bed in a second position. In the preferred embodiment, the rack is a skeleton structure, generally U-shaped in inside elevation. Rack movement is athwart the beam of the vehicle.

DESCRIPTION OF THE PREFERRED EMBODIMENT

Figure 1:
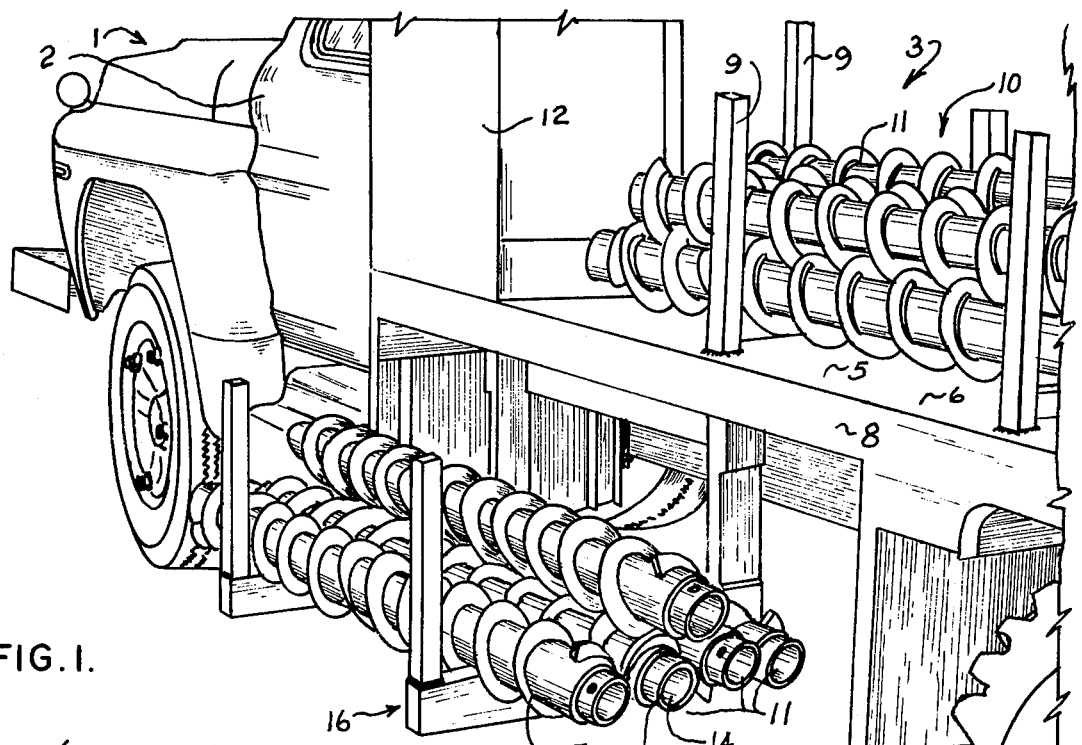
FIG. 1 is a view in perspective, partly broken away, of the vehicle utilizing the rack of this invention, the rack being illustrated in its extended position.

Referring now to FIG. 1, reference numeral 1 indicates a mobile drilling unit embodying the rack of this invention. Mobile drilling unit 1 includes a truck cab 2 and a load bearing flatbed 3.

The cab 2 is conventional and the modification of truck bodies so as to convert them to drilling units is well known in the art. Such conversions generally utilize a flatbed truck to mount drilling apparatus similar to that disclosed in the Rassieur U.S. Pat. No., 3,527,309, discussed above. These trucks conventionally have a flatbed cover 5 placed over a plurality of spaced parallel frame sections, designated by the numerals 4 and 17. The flatbed cover 5 is attached to the frame sections by any convenient method. The cover 5 has a top wall 6 and a bottom wall 7. The embodiment illustrated also has a turned edge 8 extending downwardly from the wall 7. That portion of the truck structure below the bottom wall 7 of the flatbed 3 is known in the art, and for the purposes of this specification is defined, as the truck undercarriage.

Prior art drilling units have included a plurality of posts 9 which are welded to the top 6 of flatbed cover 5 in spaced relationship to one another, to form a storage area 10 for a plurality of drilling augers 11. The posts 9 may be any convenient structure. Common angle iron beams work well.

It also is conventional to construct a water tank 12 along the flatbed 3, next to the cab 2. The tank 12 generally is designed to contain approximately 250 gallons of water, the water being useful in the operation of the drilling unit 1.

The augers 11 conventionally are cylindrical sections 13 having axial openings 14 through them. A ridge 15 spirals about the cylindrical section 13. As indicated above, the size, weight, and constructional design of the augers 11 makes their loading and unloading from the drilling unit a difficult operation. I have lessened substantially the problem of carrying a number of the augers 11 by constructing a movable rack 16 which is mounted to the conventional truck structure previously described. This achievement cannot be appreciated fully without envisioning the limited space available for mounting the rack 16 structure on the undercarriage side of the flatbed 3.

Figure 3:
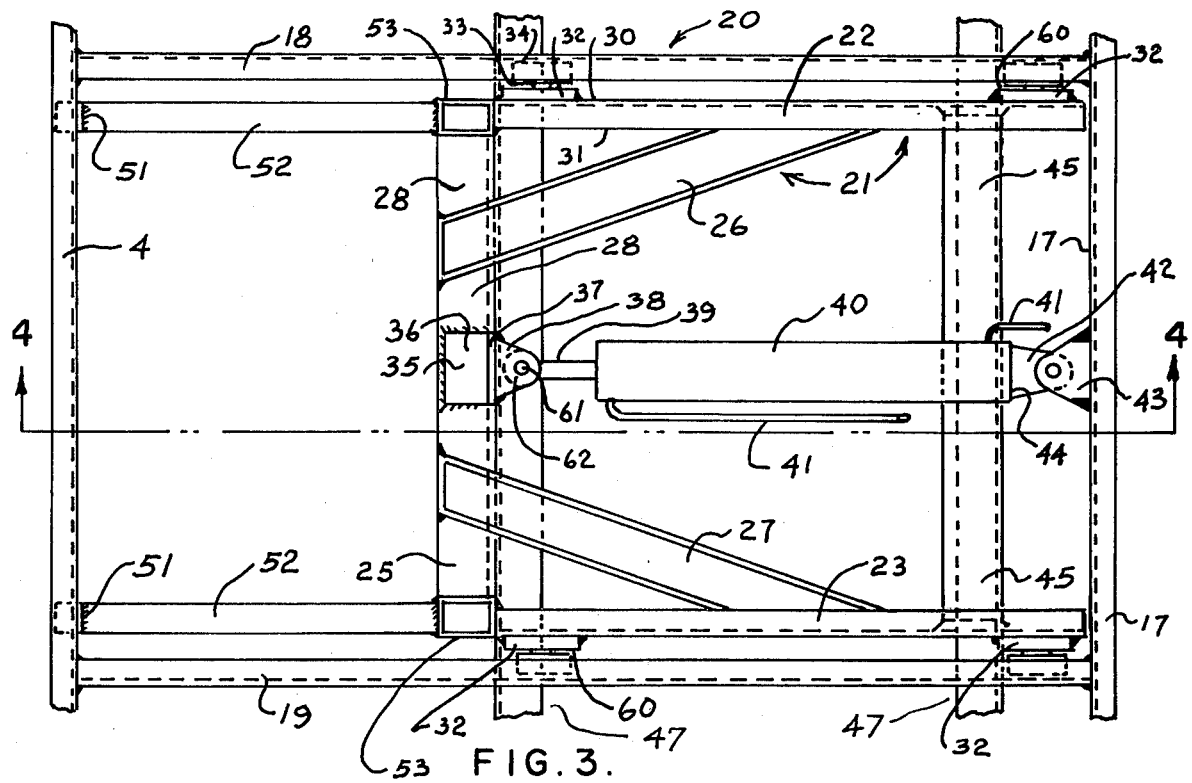
FIG. 3 is a sectional view, partly broken away, taken along the line 3—3 of FIG. 2.
Figure 4:
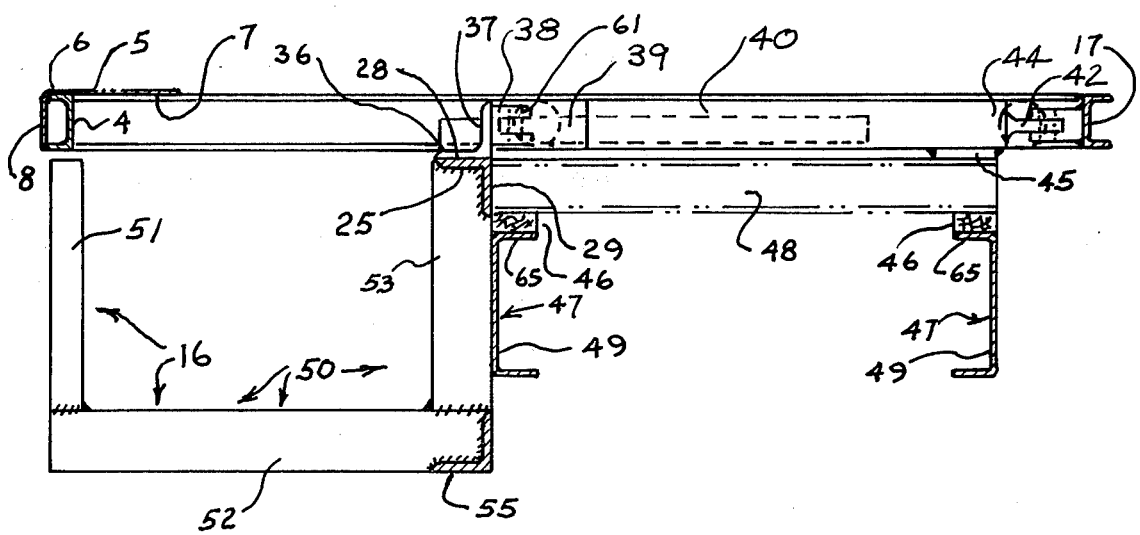
FIG. 4 is a sectional view taken along the line 4—4 of FIG. 3.

In order to achieve rack mounting, a first track member 18 is attached between the frame sections 4 and 17, by any convenient method. Conventional welding techniques work well for the mounting method. A second track member 19 is positioned parallel to and spaced from the track member 18 and it likewise is mounted between the sections 4 and 17. While the particular truck illustrated in the drawings and utilized in the construction of my invention included frame sections 4 and 17 to support the flatbed 3, those skilled in the art recognized that the sections 4 and 17 may be fabricated separately and added to the undercarriage of the flatbed 3 in the truck bodies where they are not conventionally provided. The sections 4, 17, 18 and 19 form a rectangular grid 20 best shown in FIG. 3. In some applications, the spacing of the members comprising the grid 20 may be adjusted to accommodate a variety of rack 16 sizes, particularly in those applications where the sections 4 and 17 are additions to the undercarriage of the flatbed 3. Generally, however, the frame sections 4 and 17 spacing is restricted by the particular truck model design, thereby fixing the rack 16 size.

Each of the track sections 18 and 19 are U-shaped beams having the channel of the U-shape facing one another, as installed in the grid 20.

A dolly 21 is formed by a first horizontal segment 22, a second horizontal segment 23, a cross piece 25, a cross brace 45 and a pair of angle supports designated by the numerals 26 and 27 respectively.

The cross piece 25 is, in the embodiment illustrated, a conventional angle iron member having a top 28 and a side 29. Each end of the cross piece 25 is connected to the rack 16 and to segments 22 or 23 respectively of dolly 21.

The angle supports 26 and 27 are shallow channel U-shaped members joined to the top 28 of cross piece 25 at a first end of each support. A second end of support 26 is connected to segment 22, while second end of support 27 is connected to segment 23. Connection may be accomplished by any convenient means. Conventional welding techniques work well. The supports 26 and 27 give additional structural rigidity to the dolly 21 structure and enable it to bear the rack 16 load as explained in detail hereinafter. The segments 22 and 23 are parallel to and spaced from one another. The segments 22 and 23 extend from the cross piece 25 to aft of the cross brace 45. The cross brace 45 also is a conventional flat iron member 9 whose function is to give structural rigidity to the dolly 21.

Because segments 22 and 23 are identical, only a single segment 22 is described in detail, those skilled in the art recognizing that the segments 22 and 23 are mirrors of one another as installed in the dolly 21. Segment 22 generally is rectangular in plan having a front 30 and a back 31. The support 26 is joined to the back 31 of the segment 22 while the support 27 is joined to the back of the segment 23. The front 30 extends outwardly to define a mounting area 32 near each end of the segment 22. Area 32 has a relatively smooth wall 60 parallel to the plane of the front 30 but which is spaced therefrom. The area 32 may be formed integrally with the segment 22 or the area 32 may be manufactured separately and later attached to the front 30. In either case, the area 32 provides means for supporting an axle 33. For example, the area 32, in the illustrated embodiment, has an opening in it. The axle 33 is inserted through the opening and secured to the area 32. Axle 33 in turn has a wheel 34 rotatably mounted to it. In the embodiment illustrated, each end of the segments 22 and 23 has a wheel 34 mounted to it along the area 32. The wheels 34, for the purpose of this specification, define roller means for mounting the dolly 21. The wheels 34 ride the track 18, are contained therein, and are supported thereby. It may be observed, with reference to FIG. 3, that the dolly 21 is free to move along the track sections 18 and 19 between the frame sections 4 and 17.

Top 28 of cross piece 25 has a connecting block 35 attached to it. Connecting block 35 is L-shaped in side elevation, having a first leg 36 joined to a second leg 37. Leg 36 is attached to the top 28 of cross piece 25. Leg 37 has a clevis 38 extending outwardly from it. Clevis 38 connects dolly 21 to a rod 39 of a hydraulic actuator 40. While clevis 38 is utilized to interconnect the rod 39 and connecting block 35, and consequently to the dolly 21, other connection techniques may be utilized for this purpose. I find the use of clevis 38 particularly efficient as interconnection is accomplished easily merely by slipping a pin 61 through both the clevis 38 and rod 39. The rod 39 conventionally has an eyelet 62 formed in it to facilitate this connection.

Actuator 40 is any of a variety of conventional hydraulic actuator systems. Commonly, actuator 40 includes a piston, not shown, connected to the rod 39 which is responsive to pressures applied by a source of hydraulic power, likewise not shown. Connection lines 41 are illustrative of hydraulic lines normally connected to the hydraulic power source.

An end 44 of actuator 40 has a connecting part 42 attached to it. Connecting part 42 is used to intermount actuator 40 to a clevis 43. Clevis 43 in turn is attached to the frame section 17. Clevis 43 like clevis 38, is a conventional way for mechanically coupling parts. The actuator 40 is free standing from and between the clevis 38 and the clevis 43. While the location of the actuator 40 may be varied, I find it convenient, because of the auger weight of this particular application, to position the actuator 40 approximately midway between track sections 18 and 19.

In order to give proper support to dolly 21 and the flatbed 3, it is desirable, if not mandatory, to utilize a plurality of spacers 48, which lie in a plane perpendicular to the plane of a main truck beam 47. The spacers 48 also are metal members, spaced along the truck undercarriage at predetermined intervals. The truck beam 47 conventionally extends the length of the flatbed 3 along a major axis of the bed 3 and is the main support for it. The spacers 48 conventionally are parallel to a minor axis of the bed 3. The beam 47 commonly includes a pair of oppositely opposed U-shaped members 49 arranged parallelwise to one another. Metal to metal contact between the flatbed 3 and the beam 47 generally is undesirable. To prevent metal to metal contact between the beam 47 and the flatbed 3, and more particularly between the spacers 48 ane the beam 47, a pair of shims 46 are attached along an upper leg 65 of the U-shaped member 49 of the beam 47 by any convenient method. The shims 46 extend along the length of and are parallel to the axis of the beam 47. Conventionally, the shims 46 are wood or other nonmetallic material.

The rack 16 is a skeleton structure formed by a plurality of U-shaped frames 50. The frames 50 include an outward vertical post 51, a bottom 52, and an inner vertical post 53. Any number of frames 50 may be used to form the rack 16. Generally, the number is restricted by space limitations beneath the bed 3. The posts 51 and 53 are either integrally constructed with or connected to the bottom beam 52 by any convenient or conventional method. Welding works well where the structural components are manufactured separately. In the embodiment illustrated, the cross piece 25 extends between the two inner vertical posts 53 of a pair of frames 50 forming the rack 16. One of the posts 53 also is connected to the first horizontal segment 22 of dolly 21. The post 53 of the second frame 50 forming the rack 16 likewise is connected to the second horizontal segment 23 of the dolly 21. A bottom cross support 55 is positioned parallel to the cross piece 25 and extends from and between the bottom beams 52 of the two frames 50.

Figure 2:
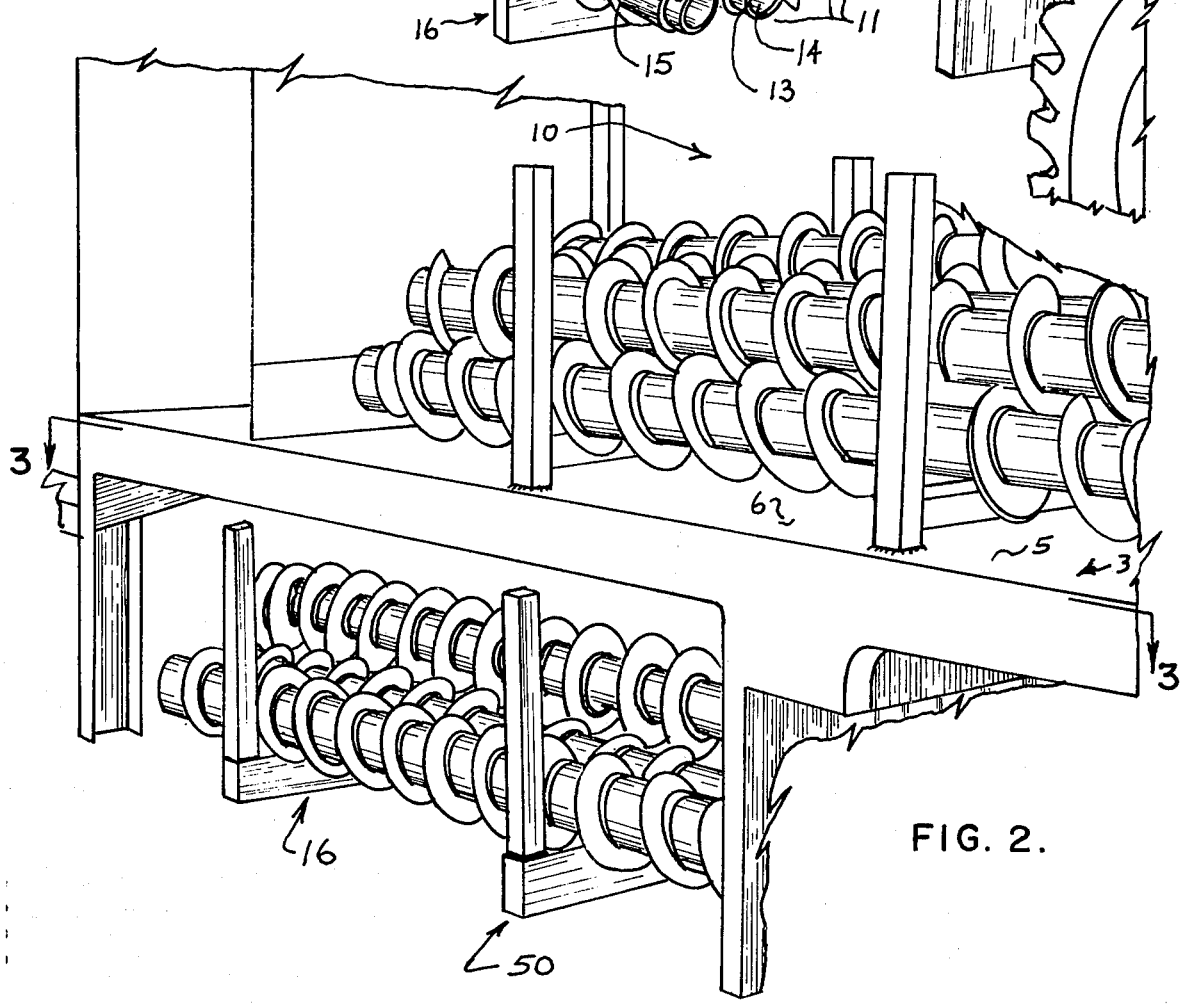
FIG. 2 is an enlarged view in perspective, partly broken away, of the vehicle and rack combination illustrated in FIG. 1, the rack being illustrated in its closed position.

As thus described and illustrated in the drawings, the rack 16 hangs cantilever fashion from dolly 21. Dolly 21 in turn, is free to move along track sections 18 and 19 in response to motion commands initiated by hydraulic actuator 40. It also is observable that in a first position of the rack 16, the rack is completely inboard of the turned edge 8 of the flatbed 3. Likewise, in a second position of the rack 16, the usable storage area of the rack 16 is outboard of the edge 8 of flatbed 3. The two positions described are graphically illustrated in FIGS. 1 and 2.

Use of this invention facilitates drilling procedures. Hydraulic actuator 40 is easy to operate and the rack 16 is moved to its outboard position for loading. Augers 11 are loaded in the rack 16 in a plane parallel to the major axis of the flatbed 3. This arrangement, along with the accessibility and lower heigth provided by the rack 16 makes the augers easy to handle. The extended position of the rack 16 also enables a workman to washdown the augers 11 quickly without making the washdown operation a major task. Where the drilling operation requires only partial use of the auger complement, those utilized may be used and cleansed without disturbing the remaining augers or the rest of the drilling unit 1 structure.

Numerous variations, within the scope of the appended claims, will occur to those skilled in the art in light of the foregoing description and accompanying drawings. Thus, while a skeleton structure for the rack 16 was shown and described, a decorative enclosure may be stretched over the frame 50 if desired. Such an enclosure may contain a plurality of openings to facilitate washdown of the augers 11. Likewise, the number of frames 50 utilized in a particular rack 16 construction may be varied. The shape, size and design configuration of various structural elements shown in the drawings may be varied. For example, the posts 51 and 53 are shown as rectangular structures. Other designs, for example, cylindrical, may be utilized. Other materials or shapes work well. Likewise, other roller means structures may be used in place of the wheels 34. For example, a plurality of rollers may be mounted to the track sections 18 and 19 and the segments 22 and 23 can be adapted to engage the periphery of the rollers. The segments 22 and 23 then would move over a plurality of rollers while the rollers themselves remained stationary during rack 16 movement. Similarly, a single track section, in the form of an I beam, for example, may be used in place of the parallel track sections disclosed. Or, the rollers may be eliminated in certain embodiments of the invention, the rack 16 movement being accomplished merely by a slip fit between the rack 16 and a corresponding track section. These variations are merely illustrative.

Having thus described the invention, what is claimed and desired to be secured by Letters Patent is:

1. A truck vehicle for carrying drilling augers including a bed for bearing equipment, said bed having a longitudinal axis comprising:

an undercarriage supporting said bed, said undercarriage including a main truck beam traversing said bed longitudinally, said truck beam being spaced from said bed;

means for carrying a plurality of drilling augers beneath said bed, at least a portion of said carrying means being mounted for movement with respect to said vehicle, said carrying means comprising shim means mounted to said truck beam and positioned above said truck beam, between said truck beam and said truck bed; spacer means abutting said shim means and positioned above said shim means between said shim means and said truck bed, a track mounted to said vehicle for confining movement of a dolly structure, said track being positioned generally athwart of said longitudinal track vehicle axis, between said spacer means and said truck bed; a dolly structure mounted for movement along said track in a direction generally athwart of said longitudinal truck vehicle axis between at least a first position and a second position, a rack for holding said drilling augers mounted cantilever fashion to said dolly structure and movable with said dolly structure between said first and said second positions, said rack being outboard of said bed in said first position and substantially beneath said bed in said second position, said rack including means for supporting said drilling augers along at least two points and side wall means for permitting stacking of said augers in said rack; and means for moving said dolly structure between said first and second positions.

2. The vehicle of claim 1 further characterized by movable means for interconnecting said dolly structure with said track, said track comprising first and second sections parallel to but spaced from another, said dolly structure being mounted between said first and said second sections.

3. The vehicle of claim 2 wherein said movable means comprises a plurality of rollers interconnected between said track and said dolly structure.

4. The vehicle of claim 3 wherein said rack is a skeleton structure constructed from a plurality of U-shaped members spaced from one another to define an auger carrying compartment, the connecting part of said U-shaped member supporting said augers, and the legs of said U-shaped members comprising said side wall means.

5. The vehicle of claim 4 wherein said means for moving said dolly structure comprises a hydraulic cylinder mounted perpendicularly to the longitudinal axis of said bed, said cylinder being operatively connected to said dolly structure.

6. The vehicle of claim 5 wherein said hydraulic cylinder is positioned midway between said track sections.

* * * * *